March 3, 1959     J. T. BURNS     2,875,683
COMBINATION CONTAINER AND BROILER PAN
Filed July 2, 1957     2 Sheets-Sheet 1
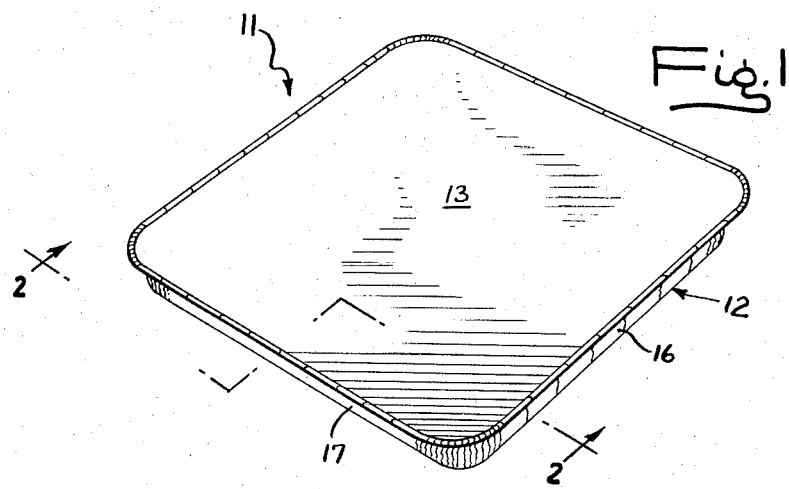
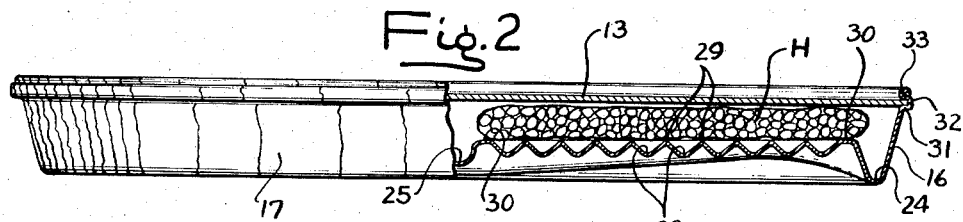
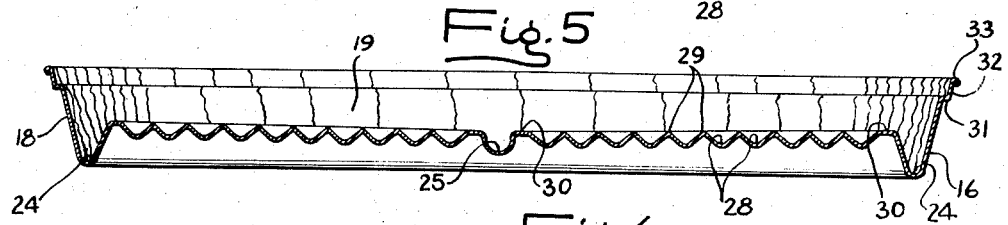
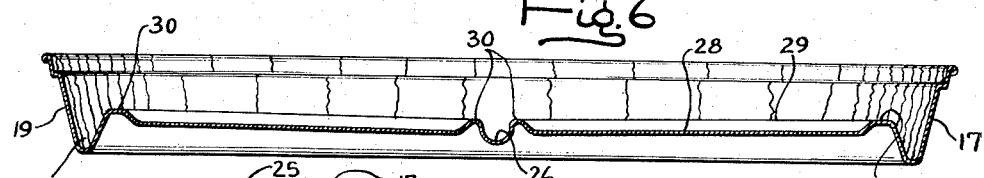
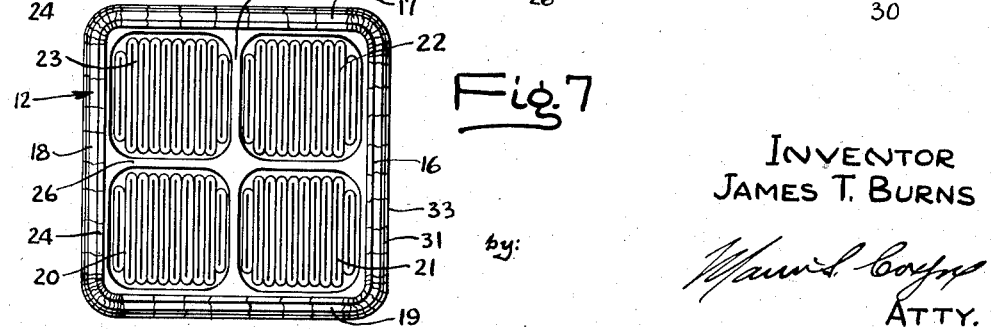
INVENTOR
JAMES T. BURNS
ATTY.

March 3, 1959  J. T. BURNS  2,875,683
COMBINATION CONTAINER AND BROILER PAN
Filed July 2, 1957

INVENTOR
JAMES T. BURNS
by:
ATTY.

United States Patent Office
2,875,683
Patented Mar. 3, 1959

2,875,683
COMBINATION CONTAINER AND BROILER PAN
James T. Burns, Chicago, Ill.
Application July 2, 1957, Serial No. 669,612
5 Claims. (Cl. 99—425)

This invention relates to a combination container and broiler pan of the type adapted to serve as a retail package for frozen meat products such as hamburgers, and which may be utilized by the consumer for broiling the hamburgers without removal from the pan.

Containers for frozen meat products involve several functional and structural requirements which have been heretofore regarded as incompatible and inconsistent. For example, since the container is disposed after use, its cost constitutes a part of the price of the retail package, and hence it is essential that the container cost be relatively slight. There are many materials, such as the conventional cardboard frequently used for food packages, which satisfy this requirement but which do not provide many other essential requisites so as to enable the container to be used as a broiler pan for the meat products packaged therein.

These other essential requisites include such factors as heat transmissivity, rigidity, resistance to heat, chemical inertness so as not to contaminate the food products, and ability to be easily and inexpensively stamped or otherwise formed to a particular structural configuration necessary to enable the meat products to be properly broiled. The latter requirement includes a structural arrangement which provides proper control and flow of the meat juices during the broiling operation and also means to separate the individual hamburger patties from each other and to prevent them from sticking to the pan.

Aluminum foil as heretofore employed provides many of the above requirements in that it is relatively chemically inert so as not to contaminate the meat; it is resistant to heat and has high heat transmissivity; it can be formed to the desired configuration by mass production stamping methods at low cost; and it is relatively inexpensive. However, the use of aluminum foil has involved several important disadvantages. More specifically, if the foil is of a gauge sufficiently thin to make its use economically feasible, it lacks the required rigidity and durability so that too great a percentage of the meat packages are damaged during shipment so as to render them unmerchantable.

The present invention involves a combination container and broiler pan so constructed and arranged that the structural elements which serve for the broiling function also serve the additional function of providing sufficient strength, rigidity and durability so that relatively thin gauge aluminum foil may be employed with its attendant advantages and without the heretofore prevalent disadvantages of this material.

Another object of the invention is to provide a container and broiler pan of the character described and having a novel construction for supporting and separating the hamburger patties or similar meat products from each other, for preventing the hamburger patties from sticking to the pan, and for controlling and regulating the flow of meat juices during the broiling operation.

Other objects and advantages are inherent in the structure claimed and disclosed, and will become apparent to those skilled in the art from the following detailed description in connection with the accompanying drawings wherein:

Fig. 1 is a perspective view of a combination container and broiler pan package embodying the present invention and showing the cover in closed position over the top of the pan;

Fig. 2 is a partial sectional view taken on line 2—2 of Fig. 1 and shows one of the hamburger patties within the package;

Fig. 5 is a transverse sectional view taken on line 5—5 of Fig. 3;

Fig. 6 is a sectional view taken on line 6—6 of Fig. 3;

Fig. 7 is a bottom plan view of the pan.

Figure 3:
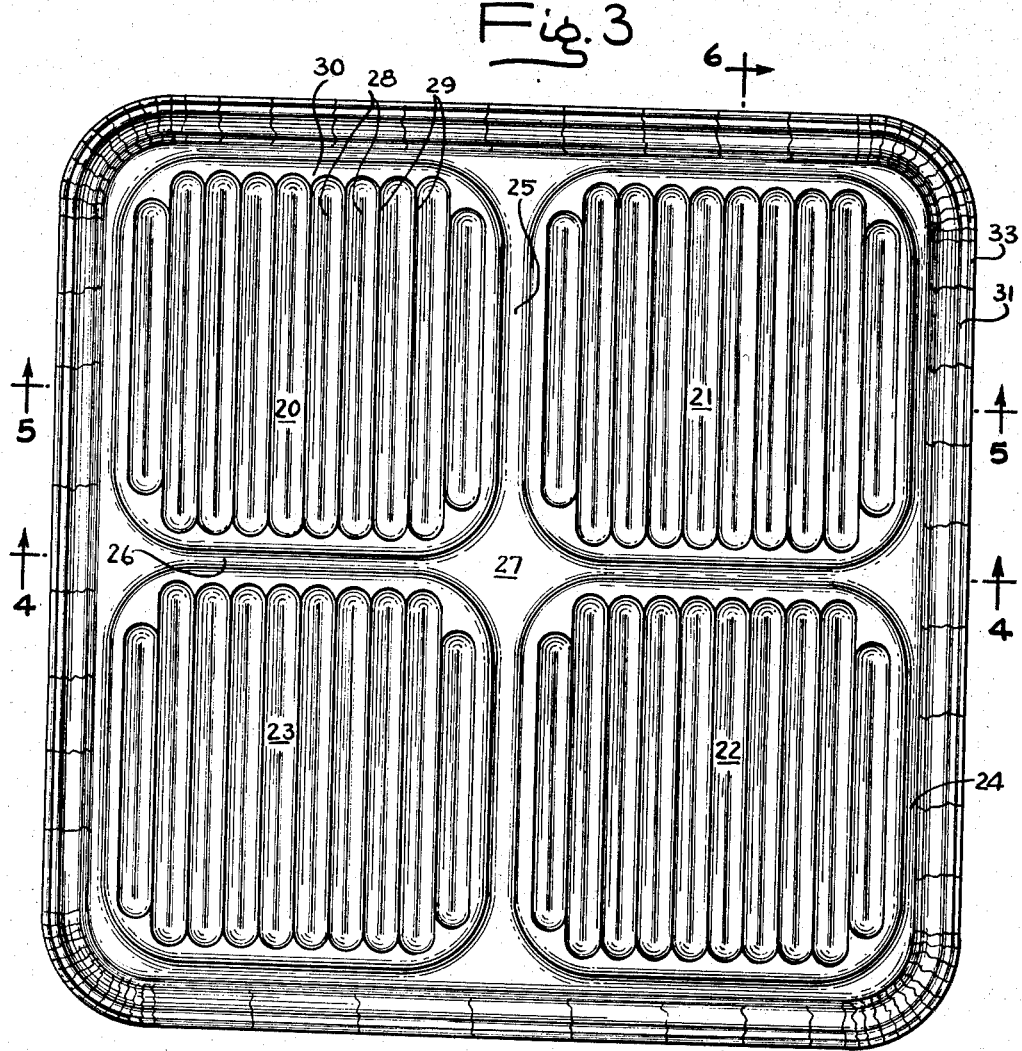
Fig. 3 is a top plan view of the pan with the cover removed.

Referring first to Fig. 1, the reference numeral 11 indicates generally a complete package in accordance with the present invention and comprising a pan 12 having an open top adapted to be closed by a cover 13. The pan 12 and cover 13 are of approximately rectangular configuration with rounded corners. The pan 12 comprises a bottom portion indicated generally at 14 formed integral with four upstanding side walls 16, 17, 18, 19 extending peripherally therearound. The cover 13 may be made of cardboard or other suitable material and pan 12 is preferably stamped from an integral sheet of aluminum foil (although other thin metal foil materials may be employed).

As best seen in Fig. 3, the bottom 14 is provided with four raised substantially rectangular platforms 20, 21, 22, 23 each adapted to support a respective one of the four hamburger patties H enclosed within the package. A peripheral channel or groove 24 extends around bottom 14 at the junction of the latter with side walls 16, 17, 18, 19. Channel 24 may also be regarded as a downwardly projecting peripheral rib serving as a support contacting the surface upon which pan 12 may rest so as to space bottom 14 above said surface.

Figure 4:
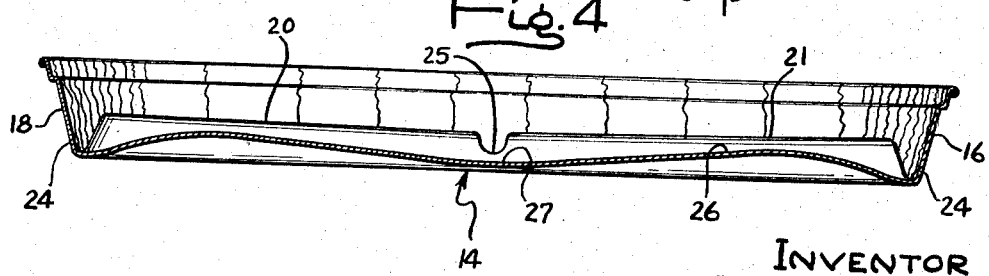
Fig. 4 is a transverse sectional view taken on line 4—4 of Fig. 3.

As best seen in Figs. 3 and 5, the bottom 14 is also provided with a transverse groove or channel 25 extending between a pair of platforms 20, 21 and the other pair of platforms 22, 23. The opposite ends of transverse channel 25 communicate with the peripheral channel 24. Extending perpendicular to channel 25 is another transverse channel 26. The latter communicates with channel 25 at an intermediate portion thereof and has its opposite ends in communication with peripheral channel 24. Channel 26 extends between the pair of platforms 20, 21 and the other pair of platforms 22, 23. As shown in Fig. 4, the intersection area of channels 25, 26 is recessed downwardly to form a well or sump 27 having a lower surface at a level slightly higher than the lower surface of the peripheral channel or bead 24.

Each of the platforms 20, 21, 22, 23 is of a similar construction and comprises a substantially horizontal surface having a series of parallel longitudinal grooves or recesses 28 providing therebetween a series of raised ribs or ridges 29 which provide minimum area contact with the hamburgers to prevent them from sticking to the pan. Each of the grooves 28 terminates a slight distance inwardly of the peripheral edge of the respective platform whereby each of the platforms 20, 21, 22, 23 is provided with a peripherally extending raised marginal area 30 for a purpose to be described.

Each of the pan side walls 16, 17, 18, 19, is provided at its upper edge with a horizontally extending cover-supporting flange 31 integrally formed therewith. An upstanding cover-sealing flange 32 is integrally joined at its lower edge with the outer edge of horizontal flange 31. The upper edge of flange 32 is provided with a rolled reinforcing bead 33. Flanges 31, 32 and bead 33 extend peripherally around the upper edge of pan 12.

After the four hamburger patties H are each placed upon a respective one of the platforms 20, 21, 22, 23, the pan 12 is closed and sealed by placing the cover 13 so that its marginal area rests upon horizontal flange 31. Sealing flange 32 is then rolled or otherwise deformed inwardly over the upper marginal surface of cover 13 so as to secure the latter in tight engagement with pan 12. The sealed package 11 containing the four hamburger patties H is then frozen and shipped in a frozen state to the retail store where it is maintained in a frozen state when purchased by the consumer who places package 11 in the refrigerator until ready for use. In this event, the consumer merely removes cover 13 and places the pan 12 containing the hamburger patties H within the oven until the hamburgers are broiled to the desired degree.

During the broiling operation, the hamburgers emit juice which drops downwardly into the grooves 28 until the latter are filled. The raised marginal area 30 extending peripherally around each of the platforms 20, 21, 22, 23 retains a quantity of juice within the grooves 28, which quantity is predetermined to maintain the hamburgers in proper juicy condition. However, the amount of juice in excess of that which is required to fill grooves 28 and thereby maintain the lower surfaces of the hamburgers in the desired condition during the broiling operation, flows over the raised marginal areas 30 and then downwardly to the channels 24, 25, 26. The centrally located recess 27 serves as a sump for collecting a substantial portion of the juice flowing into transverse channels 25, 26 and the concentration of juice in sump 27 maintains the juice in a fluid state instead of permitting same to dry out as would occur if the juice were spread over a wide area during the broiling operation. It will also be noted that the peripheral channel 24 is formed between downwardly converging side walls portions and consequently has a relatively small horizontal cross-section at its lower portion, and thus also serves as a sump for concentrating the overflow juice and maintaining same in a fluid state. This arrangement enables the fluid meat juice to be poured onto the hamburgers when the latter are served after the broiling operation.

The raised platforms 20, 21, 22, 23, the transverse channels 25, 26, the peripheral channels 24 and the arrangement of grooves 28 and ridges 29, in addition to serving the function of aiding the broiling operation and regulating the flow of meat juices, also function to strengthen and rigidify the pan 12. As a result, the pan 12 may be easily inexpensively stamped from relatively thin aluminum foil of approximately .004 inch thickness.

Although the use of aluminum foil strengthened by ribs has been suggested heretofore in the prior art, such arrangements have lacked the requisite rigidity and durability and did not provide the additional functions of controlling and regulating the flow of the meat juice as in the present invention.

The particular embodiment of the invention described hereinabove and disclosed in the drawings is merely illustrative of one of the many forms which the invention may take in practice without departing from the scope thereof as delineated in the appended claims.

I claim:

1. A combination container and broiler pan package for frozen hamburgers and similar products, said package comprising a relatively shallow pan having a bottom and an upstanding sidewall extending peripherally around the bottom, said pan being formed of a single integral sheet of relatively thin aluminum foil, said bottom having integrally formed therein a plurality of raised platforms each adapted to receive a separate hamburger or similar meat product, the peripheral marginal area of said bottom adjacent said sidewall coacting with the latter to provide a downwardly projecting rib extending peripherally around the lower portion of the pan and constituting a base support for the pan, the lowermost surface of said base support rib extending below the other portions of said pan bottom, said rib being in the form of a hollow peripheral channel having downwardly converging opposed wall portions so as to have a reduced horizontal cross-sectional area at the bottom thereof for concentrating the meat juices flowing thereinto so as to maintain the juices in a fluid state, said pan bottom being formed with a plurality of transversely extending recessed channels extending between respective adjacent pairs of said platforms, each of said platforms having a substantially horizontal upper surface formed with a series of parallel grooves extending substantially thereacross and providing a raised ridge between each of said grooves, said horizontal upper surface of each of said platforms being formed with a raised marginal area extending peripherally therearound and projecting upwardly at least to a height above the lowermost portions of said parallel grooves, the opposite ends of each of said parallel grooves terminating at said raised marginal areas, at least two of said transverse channels intersecting at an intermediate area of the pan bottom, said intermediate area being recessed downwardly so as to form a sump for collecting meat juices from said transverse channels and maintaining said meat juices in a fluid state, the ends of said transverse channels communicating with said peripheral channel, the upper edge of said peripheral sidewall having integrally formed therewith a horizontally outwardly extending cover-supporting flange extending peripherally therearound, the outer edge of said cover-supporting flange having integrally formed therewith a peripherally extending manually deformable cover-sealing flange, the upper edge of said cover-sealing flange having integrally formed therewith a reinforcing bead extending therearound and constituting the upper peripheral edge of said pan, a horizontally extending cover having a marginal area resting upon said cover-supporting flange, said cover-sealing flange extending around the peripheral edge of said cover and engaging the upper marginal surface of said cover so as to hold the latter in secure sealed engagement with the pan, whereby as hamburgers or similar meat products are being broiled on said platforms said hamburgers will emit meat juice which will fill said series of parallel grooves and the amount of juice in excess of that which is required to fill the grooves will flow over said platform raised marginal areas and then downwardly into said channels where the juice will be retained and collected so as to be maintained in a fluid state, and whereby said raised platforms, parallel grooves, transverse channels and peripheral channel serve the additional function of rigidifying and strengthening the thin aluminum foil pan.

2. A combination container and broiler pan for frozen hamburger patties and similar products, said pan having a bottom, and an upstanding sidewall extending peripherally around the bottom, said pan being formed of a single integral sheet of relatively thin aluminum foil, said bottom having integrally formed therein a plurality of raised platforms each adapted to receive a separate hamburger patty or similar meat product, the peripheral marginal area of said bottom adjacent said sidewall coacting with the latter to provide a downwardly projecting rib extending peripherally around the lower portion of the pan and constituting a base support for the pan, said rib being in the form of a hollow peripheral channel having downwardly converging opposed wall portions so as to have a reduced portion at the bottom thereof for concentrating the meat juices flowing thereinto so as to maintain the juices in a fluid state, said pan bottom being formed with a plurality of transversely extending recessed channels extending between respective adjacent pairs of said platforms, each of said platforms having a substantially horizontal upper surface formed with a series of parallel grooves extending substantially thereacross and providing a raised ridge between each of said grooves, at least two of said transverse channels intersecting at an intermediate area of the pan bottom, said intermediate area being recessed downwardly so as to form a sump for collecting meat juices in a fluid state, the ends of said transverse channels communicating with said peripheral channel, the upper edge of said peripheral sidewall having integrally formed therewith a horizontally outwardly extending cover-supporting flange extending peripherally therearound, the outer edge of said cover-supporting flange having integrally formed therewith a peripherally extending upwardly projecting manually deformable cover-sealing flange, the upper edge of said cover-sealing flange having integrally formed therewith a reinforcing bead extending therearound and constituting the upper peripheral edge of said pan, whereby as hamburgers or similar meat products are being broiled on said platforms said hamburgers will emit meat juice which will drop into said series of parallel grooves and then flow downwardly into said channels where the juice will be retained and collected so as to be maintained in a fluid state, and whereby said raised platforms, parallel grooves, transverse channels and peripheral channel serve the additional function of rigidifying and strengthening the thin aluminum foil pan.

3. A combination container and broiler pan for frozen hamburger patties and similar products, said pan having a bottom and an upstanding sidewall extending peripherally around the bottom, said pan being formed of a single integral sheet of relatively thin aluminum foil, said bottom having integrally formed therein a plurality of raised platforms each adapted to receive a separate hamburger patty or similar meat product, said bottom having a plurality of transversely extending recessed channels extending between respective adjacent pairs of said platforms, each of said platforms having a substantially horizontal upper surface formed with a series of parallel grooves extending substantially thereacross and providing a raised ridge between each of said grooves, said horizontal upper surface of each of said platforms being formed with a raised marginal area extending peripherally therearound and projecting upwardly to a height at least above the lowermost portions of said parallel grooves, the opposite ends of said parallel grooves terminating at said raised marginal areas, said transverse channels intersecting at an intermediate area of the pan bottom, said intermediate area being recessed downwardly so as to form a sump for collecting meat juices from said transverse channels and maintaining said meat juices in a fluid state, the upper edge of said peripheral sidewall having integrally formed therewith a horizontally outwardly extending cover-supporting flange extending peripherally therearound, the outer edge of said cover-supporting flange having integrally formed therewith an upwardly extending manually deformable cover-sealing flange, whereby as hamburgers or similar meat products are being broiled on said platforms said hamburgers will emit meat juice which will fill said series of parallel grooves and the amount of juice in excess of that which is required to fill the grooves will flow over said platform raised marginal areas and then downwardly into said channels where the juice will be retained and collected so as to be maintained in a fluid state, and whereby said raised platforms, parallel grooves, and channels serve the additional function of rigidifying and strengthening the thin aluminum foil pan.

4. A combination container and broiler pan for frozen hamburger patties and similar products, said pan having a bottom and an upstanding sidewall extending peripherally around the bottom, said pan being formed of a single integral sheet of relatively thin metal foil, said bottom having integrally formed therein a plurality of raised platforms each adapted to receive a separate hamburger patty or similar meat product, said pan being formed with a plurality of recessed channels extending between respective adjacent pairs of said platforms, each of said platforms having a substantially horizontal upper surface formed with a series of parallel grooves extending substantially thereacross and providing a raised ridge between each of said grooves, said transverse channels intersecting at an intermediate area of the pan bottom, said intermediate area being recessed downwardly so as to form a sump for collecting meat juices from said transverse channels and maintaining said meat juices in a fluid state, the ends of said transverse channels communicating with said peripheral channels, the upper edge of said peripheral sidewall having integrally formed therewith a horizontally outwardly extending cover-supporting flange extending peripherally therearound, the outer edge of said cover-supporting flange having interally formed therewith an upwardly extending manually deformable cover-sealing flange, whereby as hamburgers or similar meat products are being broiled on said platforms said hamburgers will emit meat juice which will fill said series of parallel grooves and the amount of juice in excess of that which is required to fill the grooves will flow over said platform raised marginal areas and then downwardly into said crannels where the juice will be retained and collected so as to be maintained in a fluid state, and whereby said raised platforms, parallel grooves, and transverse channels serve the additional function of rigidifying and strengthening the thin metal foil pan.

5. A combination container and broiler pan for frozen hamburger patties and similar products, said pan having a bottom and an upstanding sidewall extending peripherally around the bottom, said pan being formed of a single integral sheet of relatively thin metal foil, said bottom having integrally formed therein a plurality of raised platforms each adapted to receive a separate hamburger patty or similar meat product, the peripheral marginal area of said bottom adjacent said sidewall coacting with the latter to provide a downwardly projecting rib extending peripherally around the lower portion of the pan and constituting a base support for the pan, said rib being in the form of a hollow channel and having downwardly converging opposed walls so as to have a reduced portion at the bottom thereof for concentrating the meat juices flowing thereinto and thereby to maintain the juices in a fluid state, said pan bottom being formed with a plurality of transversely extending recessed channels extending between respective adjacent pairs of said platforms, each of said platforms having a substantially horizontal upper surface formed with a series of parallel grooves extending substantially thereacross and providing a raised ridge between each of said grooves, said horizontal upper surface of each of said platforms being formed with a raised marginal area extending peripherally therearound and projecting upwardly to a height at least above the lowermost portions of said series of parallel grooves, the opposite ends of said parallel grooves terminating at said raised marginal areas, the ends of said transverse channels communicating with said peripheral channel, the upper edge of said peripheral sidewall having integrally formed therewith a horizontally outwardly extending cover-supporting flange extending peripherally therearound, the outer edge of said cover-supporting flange having integrally formed therewith an upwardly extending manually deformable cover-sealing flange.

References Cited in the file of this patent

UNITED STATES PATENTS

| 2,088,074 | Voight | July 27, 1937 |
| 2,411,993 | Hobson | Dec. 13, 1946 |
| 2,673,003 | Stewart | Mar. 23, 1954 |

FOREIGN PATENTS

| 169,610 | Germany | Mar. 30, 1905 |
| 818,217 | France | Sept. 21, 1937 |
| 742,484 | Great Britain | Dec. 30, 1955 |